Nov. 25, 1958  R. L. LONGINI  2,862,184
SEMICONDUCTOR TRANSLATING DEVICE
Filed Sept. 28, 1954
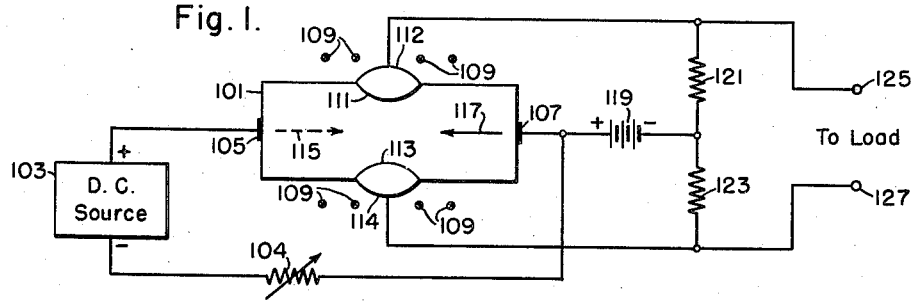
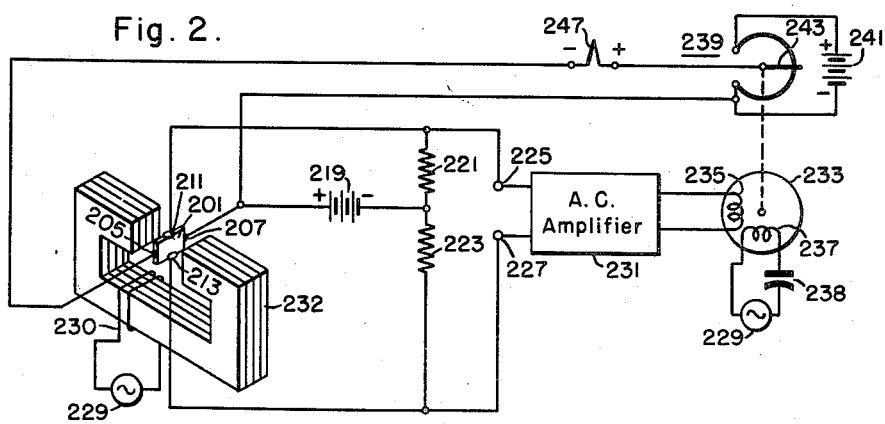
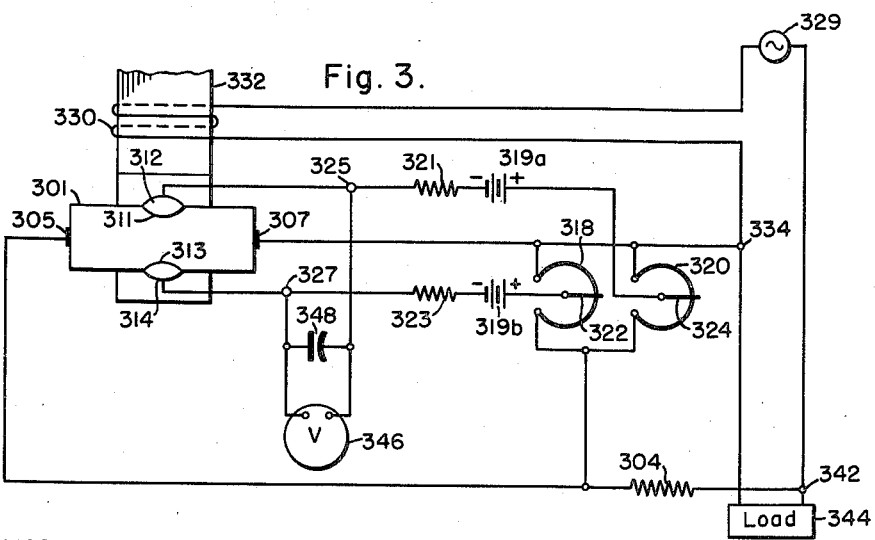
WITNESSES
Robert C. Baird
John B. Davidson
INVENTOR
Richard L. Longini.
BY
Paul E. Friedemann
ATTORNEY United States Patent Office 2,862,184
Patented Nov. 25, 1958

2,862,184
SEMICONDUCTOR TRANSLATING DEVICE

Richard L. Longini, Pittsburgh, Pa., assignor to Westinghouse Electric Corporation, East Pittsburgh, Pa., a corporation of Pennsylvania Application September 28, 1954, Serial No. 458,899

14 Claims. (Cl. 324—142)

This invention relates to semiconductor translating devices and more particularly to electrical circuits utilizing semiconductor devices wherein an output voltage is derived that is functionally related to the magnitudes of an electric current and of a magnetic field applied to the semiconductor.

In U. S. Patent No. 2,464,807 to A. Hansen, Jr., there is described a device for converting a direct current signal into an alternating current signal of proportional amplitude making use of the so-called "Hall effect" in a semiconductor body. A thin rectangular semiconductive plate or squat prism transversed by a direct current between two opposite edges thereof is disposed in a varying magnetic field and output terminals are affixed to the other two opposite edges of the plate. By virtue of the potential gradiant appearing across the plate between the output terminals as a result of the simultaneous application of electric current and magnetic field to the plate it is possible to derive an output voltage proportional to the magnitude of the direct current, assuming that the magnetic field varies uniformly between maximum field strengths. This output voltage is amplified and is utilized to control a well known type of temperature control apparatus.

The device described in Patent 2,464,807 has been found to suffer from a number of rather serious defects. The Hall output voltage of the plate is inherently quite small; so small, in fact, that not infrequently it has been found to be useless for control purposes in the environment for which it was designed. The dimensions of the semiconductive plate necessarily must be very small if measurable output voltage is to be derived from the device. It has been found that the dimensions are so small as to render the device impractical when voltages of satisfactory magnitude are derived therefrom. Furthermore, the output voltage is so dependent upon the dimensions of the plate that reproducibility of operating characteristics renders mandatory such close machining of the plate as to result in an extremely high reject ratio. Additionally, the output voltage from the Hall plate drops rapidly as current is drawn from the plate. Inasmuch as load impedance must be very carefully matched to the output impedance of the plate (which latter impedance is inherently very low) relatively large currents must be drawn from the device, thus seriously dropping the magnitude of the output voltage in practical embodiments of the device.

One object of my invention is to provide an electrical translating device making use of semiconductive bodies wherein an output voltage of considerable magnitude is obtained by the application of electric and magnetic fields to the semiconductive body.

Another object of my invention is to provide an electric translating device utilizing a semiconductive body to which magnetic and electric fields are applied wherein the output voltage is relatively independent of temperature variations.

Still another object of my invention is to provide an electric translating device making use of a semiconductive body to which electric and magnetic fields are applied wherein the output current is relatively independent of variations in the magnitude of the load device coupled thereto.

Still another object of my invention is to provide an electric translating device making use of the semiconductive body to which electric and magnetic fields are applied wherein magnitude of the output voltage is substantially independent of the "Hall voltage" appearing across the semiconductor.

Still another object of my invention is to provide an electric translating device making use of a semiconductive body to which electric and magnetic fields are applied wherein the output voltage in a given device is dependent only upon variations in the electric and magnetic field intensity.

As one feature of our invention, a semiconductive body is provided having at least one p-n junction of the area type formed thereon. Each junction is biased through an impedance of substantial magnitude, the bias being in such a direction that minority carriers within the body pass through the junction with substantially no opposition. The portion of the semiconductive body including the junction is disposed in a magnetic field the direction of the lines of flux of which is such that the oppositely traveling minority and majority carriers in an electric current traversing the body in a direction transverse to the magnetic field are deflected toward the junction. The majority carriers are stopped by the junction, but most of the minority carriers pass through the junction without combining with the majority carriers in the vicinity of the junction. When p-n junctions are formed on opposite edges of the semiconductive body such that the current passes therebetween, the carriers are deflected toward only one of the junctions assuming a constant direction of the magnetic field. The resultant potential gradient across the semiconductive body as a result of the accumulation of majority carriers on one side thereof (the "Hall effect" described in the aforementioned Patent No. 2,464,807) tend to repel minority carriers from the p-n junction towards which carriers are not deflected by the magnetic field, thus aiding the magnetic field and diminishing the probability that minority carriers or charges will entirely traverse the semiconductive body. The current due to minority charges passing through the p-n junction has been found to be functionally related to the current density of the electric current passing through the semiconductive body and to the intensity of the magnetic field applied thereto; the relationship is expressed in equation form as follows:

$$I_h = k\, I_1\, H + I_s$$

where $I_1$ is the current passed through the semiconductive body, H is the magnetic field strength, k is a constant of the device, and $I_s$ is a leakage current across the junction.

Other objects and features of my invention will become apparent upon consideration of the following detailed description thereof when taken in connection with the accompanying drawings wherein:

Figure 1 is a schematic diagram showing one embodiment of my invention, and

Figs. 2 and 3 are schematic diagrams showing other embodiments of my invention as applied to a temperature control system and to power measuring apparatus.

With reference now to Fig. 1, there is shown a semiconductive body 101 which is preferably in the form of a rather thin, perpendicular to the paper of the drawing, rectangular plate having low resistance connection terminals 105 and 107 connected to the narrow or short sides thereof. For reasons that will be explained below, the semiconductor should be almost, but not quite, intrinsic; for example, it may be either slightly n-type or slightly p-type germanium. The terminals 105 and 107 should be of a material that has very little resistance to current flow in both directions and which will make a low ohmic contact with the semiconductor; lead-tin solder has been found to perform satisfactorily for this purpose. Area type p-n-junctions 111 and 113 are formed on the wide sides of the semiconductor plate. These p-n junctions may be formed by the alloy process such as described by R. N. Hall in Proceedings of the IRE, November 1952, page 1512. The grown junction forming process may likewise be used as long as care is taken to insure that the rectifying barrier is of the same sense at all points and that the ratio of impedance in one direction to the impedance in the other direction is very high. It has been found that point contact rectifying means and plated junctions are unsatisfactory for the purposes of my invention.

A direct current source 103 is connected between terminals 105 and 107; as shown, the positive terminal of source 103 is connected to semiconductor terminal 105 and the negative source terminal to semiconductor terminal 107. D. C. source 103 may be a battery or other convenient means well known to the art. If desired, a variable resistance 104 may be inserted between the D. C. source and one of the semiconductive terminals 105, 107 to adjust the current output of source 103 under given operating conditions.

A magnetic field, the lines of force of which are indicated by reference numerals 109 is imposed on the semiconductor so as to pass through the thin dimension of the plate. As viewed, the lines of force of the magnetic field are going into the paper. The magnetic field may be produced by an electromagnet having an air gap within which the semiconductor plate is disposed. (Such a construction is illustrated in Fig. 2.)

The p-n junctions 111, 113 are biased in a direction such as to oppose the flow across the junction of majority carriers within the semiconductor body 101. For example, assuming that the semiconductor body is of n-type germanium and that the other terminals 112 and 114 of p-n junctions 111 and 113, respectively, are of indium, the positive terminal of bias source 119 will be connected directly to semiconductor terminal 107; the negative terminal of source 119 will be connected to junction terminals 112 and 114 through resistances 121 and 123, respectively. Load terminals 125 and 127 are respectively connected to junction terminals 112 and 114.

The arrows 115 and 117 respectively represent the direction of flow of minority and majority carriers of the electric current. Assuming again that the semiconductor is of n-type germanium, 115 will represent the direction of flow of holes while 117 will represent the direction of flow of electrons.

Neglecting the effect of p-n junction 113 for the moment, with a magnetic field applied to the semiconductor as shown (the lines of force going into the paper) both holes and electrons passing through the semiconductor between terminals 105 and 107 will be deflected upwardly towards p-n junction 111. The electrons will be unable to pass through the rectifying barrier but the holes will pass freely therethrough. Some holes, of course, will recombine with electrons and others will pass entirely through the semiconductor from terminal 105 to terminal 107, but those holes that reach the p-n junction will pass therethrough, through load resistance 121 to the potential source 119 and an output voltage proportional to the resulting current will appear across resistance 121.

With p-n junction 113 now connected in the circuit, it is apparent that again holes and electrons will still tend to be deflected to p-n junction 111 rather than to junction 113. Without the magnetic field applied, a certain number of holes will find their way to both junctions, and will pass therethrough and through the load resistances, producing a leakage current. The holes deflected to junction 111 will add to the leakage current therethrough and will subtract from the leakage current through junction 113 in approximately equal amounts. As a result of the accumulation of electrons along the upper edge of the semiconductor plate and around the p-n junction 111, a potential gradient will be set up across the semiconductor plate; this is the well-known "Hall effect." The direction of this potential gradient is such as to make junction 113 positive with respect to junction 111, thus tending to repel holes that might find their way to junction 113 and effectively aiding the magnetic field. As mentioned above, it has been found that the current due to the imposition of the magnetic field is approximately proportional to the magnitude of the applied field, the strength of the current, and a constant dependent upon the constants of the semiconductor plate such as the dimensions thereof, the type of semiconductor and "doping" impurity included therein, and certain other variables. The current $I_{n1}$ through junction 111 and $I_{n2}$ through junction 113 may be expressed by the equation:

$$I_{n1} = KI_1H + I_s$$
$$I_{n2} = -KI_1H + I_s$$

The output voltage appearing across load terminals 125, 127 will be approximately equal to $2KI_1HR_1$ where R is the resistance of one of the elements 121, 123 and assuming that an alternating current source has replaced the direct current source 103 as shown in Fig. 1. The leakage currents across the junctions 111, 113 will effectively counteract and cancel each other insofar as the output voltage is concerned.

As mentioned above, the semiconductor 101 is almost intrinsic but has a very small amount of doping impurity included therein. There are two reasons for this. As is well known, at a given ambient temperature the relationship between the electron density and the hole density is given by the following equation:

$$pn = K^2$$

where $p$ is the hole density, $n$ is the electron density and $K$ is a constant. The electron density "$n$" is given by the formula:

$$n = N_d + p$$

where $N_d$ is the concentration of doping impurity of n-type in excess of p-type impurity. It can be seen, therefore, that in order to have a substantial number of holes in an n-type semiconductor, the semi-conductor can be only slightly doped. Obviously, the number of holes available to cross the p-n junctions 111, 113 must be as high as possible if the device is to be most effective. In order to have p-n junctions at all with the semiconductor 101 serving as one of the terminals thereof, the semiconductor 101 obviously cannot be intrinsic.

As has been mentioned, the semiconductor body 101 may be made of slightly doped germanium, silicon, or semiconductive compounds made of stoichiometric ratios of a group III element and a group V element of the periodic table. The compounds which have been most satisfactory are those utilizing group III elements aluminum, gallium and indium, and group V elements phosphorus, arsenic and antimony. The nine compounds so formed are AlP, AlAs, AlSb, GaP, GaAs, GaSb, InP, InAs, InSb; reference is made to the article by H. Walker appearing in Zeitschrift für Naturforschung, 7a, page 744 (1952) for a discussion of these compounds.

In Fig. 2, there is shown an embodiment of my invention for use in measuring temperature. In Figs. 1 and 2, reference numerals having the same last two digits designate identical components having essentially the same functions. For example, semiconductor plate 201 and potential source 219 in Fig. 2 are identical to semiconductor plate 101 and potential source 119 of Fig. 1.

The magnetic field passing through the thin dimension of semiconductor plate 201 is shown as being produced by an electromagnet 232 having an air gap within which at least the portion of the semiconductor plate 201 including the p–n junction 211 is disposed. The electromagnet is energized by means of an alternating current source 229 coupled to the iron of the magnet by means of a coil 230. The alternating current source may be of any convenient frequency, for example, 60 cycles per second and should be of constant amplitude. The semiconductor plate 201 is coupled to load resistances 221, 223, to junction biasing source 219 and to output terminals 225, 227 in the same manner as described with reference to Fig. 1.

Low ohmic connection terminal 205 is connected to the negative terminal of a thermocouple 247, the positive terminal of which is connected to the tap 243 of a potentiometer 239. A constant amplitude potential source 241, for example, a standard direct current cell, is connected across the output terminals of the potentiometer. The negative terminal of potential source 241 is connected directly to low ohmic connection 207.

Output terminal 225 and 227 are connected to an alternating current amplifier 231, the output of which is connected to the variable phase of a two phase servo motor, the first phase 237 of which is connected to alternating current source 229 through a capacitor 238 in a manner and for purposes well known to the art (note that first phase 237 and energizing coil 230 are coupled to the same alternating current source). The output shaft of motor 233 is mechanically connected to the variable tap 243 for the purpose of varying the position of the tap in accordance with the direction of rotation of the motor shaft.

Assuming that tap 243 is positioned so as to have the same voltage between the tap and the negative terminal of potential source 241 as is generated by thermocouple 247, no current will flow through semiconductor plate 201 and no output voltage will appear across output terminals 225, 227. However, with a variation in the temperature of the thermocouple let it be assumed that the voltage increases such that current will flow through the semiconductor from terminal 207 to terminal 205. An alternating output voltage will appear across terminals 225, 227 in accordance with the reversals in the direction of the magnetic field through semiconductor plate 201 under the influence of alternating current source 229. This voltage is amplified by A. C. amplifier 231 and applied to the variable phase 235 of motor 233, thereby causing rotation in such a direction as to move tap 243 towards the positive terminal of the potentiometer, and balancing out the change in voltage generated by thermocouple 247.

A decrease in the output voltage of thermocouple 247 will result in the passage of current from semiconductor terminal 205 to terminal 207, an output voltage of the reverse phase from that produced by current flow from terminal 207 to terminal 205, rotation of motor 233 in the opposite direction so as to drive the tap downwardly as viewed, and again bring the system into balance.

In Fig. 3 there is shown a modification of my invention that is useful for the measurement of alternating current power. Here again, reference numerals in Figs. 1 and 3 wherein the last two digits are identical refer to components of the same type and having essentially the same function. Semiconductor plate 301 is disposed in the air gap of a magnet 332 in the same manner as shown in Fig. 2, only a portion of the magnet being shown in Fig. 3, it being understood that the magnetic lines of force are normal to the plane of the paper. As shown, the exciting coil 330 of the magnet is connected in an alternating current transmission line between an alternating current generator 329 and an A. C. load 344. Low ohmic terminal 305 is connected to one conductor of the transmission line at junction 342 and low ohmic terminal 307 is similarly connected ot the other conductor of the transmission line at terminal 334. Resistor 304 is inserted between terminal 305 and junction 342 to control the magnitude of the current through the semiconductor plate under given operating conditions. Bias for p–n junction 311 is supplied by potential source 319a through load resistance 321, which load resistance is connected between junction terminal 312 and the negative terminal of source 319a. The positive terminal of source 319a is connected to the adjustable tap 324 of a rheostat 320, the terminals of which rheostat are connected between low ohmic terminals 305 and 307. Similarly, p–n junction 313 is biased by a potential source 319b through load resistance 323 and potentiometer 318. The positive terminal of battery 319b is connected to the variable tap 322 of potentiometer 318, the terminals of the potentiometer 318 being likewise connected between low ohmic terminals 305 and 307. The function of potentiometers 318 and 320 is to prevent an alternating voltage component from being superimposed upon the bias potential across the p–n junctions due to the alternating voltage appearing between either of the low ohmic terminals and either of p–n junction terminals 312 and 314. Effectively, the positive terminal of bias sources 319a and 319b are brought to a potential corresponding to that in the semiconductive plate 301 midway between terminals 305 and 307.

The output terminals 325 and 327 are coupled to the terminals of a D. C. voltmeter 346. A capacitor 348 is similarly connected across terminals 327, 325.

Assuming that load 344 is resistive so that the current in the alternating current line will be in phase with the voltage across the load the current through semiconductor 301 will be in phase with the variations of the magnetic field. The alternating voltage output across terminals 325, 327 will always be of the same sense since the direction of current flow reverses simultaneously with the direction of the magnetic lines of flux passing through the semiconductor plate 301. Since the output voltage is proportional to both the strength of the magnetic field H and to the current through the semiconductive plate 301 which in turn are respectively proportional to the line current and to the line voltage, the instantaneous voltage appearing between terminals 325, 327 will be proportional to the power being consumed by the load at any instant. The function of capacitor 348 is to integrate this voltage so that voltmeter 346 will read only the average voltage appearing across terminals 325, 327. If the load has a reactive component, the current passing through the semiconductive plate 301 will reverse either before or after the direction of the magnetic field reverses on a given cycle of operation, depending upon whether the reactive component is inductive or capacitive. Instantaneously, however, the voltage output is still proportional to the instantaneous power, the reactive power being indicated when the voltage is of one polarity and real power being indicated when the voltage is of the other polarity. Since capacitor 348 integrates this voltage, voltmeter 346 will indicate the actual average power being consumed by the load.

It has been found that the change in output voltage with variation in operating temperature is very low, in a typical example being less than 20% for a temperature variation of 40° C. Inasmuch as the output current is substantially independent of the bias voltage placed across the p–n junction and is substantially independent of the Hall voltage generated within the semiconductor, the load voltage is substantially independent of variations in load current. The load impedance need not be very particularly matched to the output impedance of the generator, and as has been indicated, may be varied over a considerable range without particularly affecting the magnitude of the load current. It has been found further that variations in the dimensions of the semiconductive plate do not materially affect the operation of the device inasmuch as any variations can be easily compensated by changes in the quiescent current through the semiconductor plate and changes in the magnetic field applied thereto. For example, the distance between the p–n junctions has been varied between .25 mm. to 3 mm. without affecting the operation and indications are that this dimension may be increased to 10 mm. without deleterious effects.

To measure the magnitude of a magnetic field, it is only necessary to dispose the semiconductor as shown in Fig. 1, and to substitute a constant amplitude A. C. source for D. C. source 101. Likewise, to adapt the invention for use as a multiplier in a computer, it is only necessary to express one variable as a magnetic field and the other variable as an electric current.

The invention, therefore, is not to be restricted to the specific structural details, arrangement of parts, or circuit connections herein set forth as various modifications thereof may be effected without departing from the spirit and scope of this invention.

I claim as my invention:

1. Apparatus for deriving an output voltage variable in accordance with variations in a control current and a magnetic field comprising: a semiconductor plate having substantantially rectangular cross section; a control current source connected to two opposite short edges of said rectangular plate; said semiconductor plate forming one electrode of p-n junction means formed at least at one of the other edges thereof; said semiconductor plate being formed of non-intrinsic semiconductive material; means including output impedance means biasing said p-n junction to facilitate passage of minority carriers therethrough from said plate; and magnetic field producing means for establishing a magnetic field through said plate to effectively deflect minority carriers toward and away from a given p-n junction in accordance with the direction of said magnetic field, said output voltage being derived across said output impedance.

2. Apparatus for deriving an output voltage variable in accordance with variations in a control current and a magnetic field comprising: a semiconductor plate having substantially rectangular cross section; a control current source connected to two opposite short edges of said plate; said semiconductor plate forming one electrode of p-n junction means formed at least at one of the other edges thereof; said semiconductor plate being formed of non-intrinsic semiconductive material selected from the group consisting of germanium, silicon and semiconductive compounds made of stoichiometric ratios of a group 3 element and a group 5 element of the periodic table; means including output impedance means biasing said p-n junction to facilitate passage of minority carriers therethrough from said plate; and means for establishing a magnetic field through said plate to effectively deflect minority carriers toward and away from a given p-n junction in accordance with the direction of said magnetic field, said output voltage being derived across said output impedance.

3. Apparatus for deriving an output voltage variable in accordance with variations in a control current and a magnetic field comprising: a semiconductor plate having substantially rectangular cross section; a control current source connected to two opposite short edges of said plate; said semiconductor plate forming one electrode of p-n junction means formed at least at one of the other opposite edges thereof; said semiconductor plate being formed of semiconductive material having a ratio of majority carrier density to minority carrier density of not greater than 10 to 1; means including output impedance means biasing said p-n junction to oppose passage therethrough of majority carriers from said plate; and means for establishing a magnetic field through said plate to effectively deflect minority carriers toward and away from a given p-n junction in accordance with the direction of said magnetic field, said output voltage being derived across said output impedance.

4. Apparatus for deriving an output voltage variable in accordance with variations in a control current and a magnetic field comprising: a semiconductor plate having substantially rectangular cross section; a current source connected to two opposite short edges of said plate; said semiconductor plate forming one electrode of p-n junction means formed at least at one of the other edges thereof; said semiconductor plate being formed of non-intrinsic semiconductive material; means including output impedance means biasing said p-n junction to oppose passage of majority carriers from said plate; the ratio of electron density to hole density being not greater than 10 to 1 when said semiconductor plate is of an n-type material and not smaller than 1 to 10 when of a p-type material; and means for establishing a magnetic field through said plate to effectively deflect minority carriers toward and away from a given p-n junction in accordance with the direction of said magnetic field, said output voltage being derived across said output impedance.

5. In combination: a body of semiconductive material forming one electrode of at least one electrical rectifying junction means; means for establishing a current flow through said body of semiconductive material; magnetic field producing means for deflecting minority carriers in said body of semiconductive material to or from said junction means; and means including output impedance means biasing said junction means to facilitate passage therethrough of minority carriers in said body of semiconductive material.

6. In combination: a body of semiconductive material forming one electrode of at least one p-n junction means; means for establishing a current flow through said body of semiconductive material; magnetic field producing means for deflecting minority carriers in said body of semiconductive material to or from said p-n junction means; and bias source means including output impedance means biasing said p-n junction means so as to facilitate passage of minority carriers in said semi-conductive material through said p-n junction means.

7. In combination: a body of semiconductive material forming one electrode of at least one area type p-n junction means; means for establishing a current flow through said body of semiconductive material; magnetic field producing means for deflecting minority carriers in said body of semiconductive material to or from said area type p-n junction means; and bias source means including output impedance means biasing said area type p-n junction means so as to facilitate passage of minority carriers in said semiconductive material through said area type p-n junction means.

8. In combination: a body of semiconductive material forming one electrode of at least one area type p-n junction means; means for establishing a current flow through said body of semiconductive material; magnetic field producing means for deflecting minority carriers in said body of semiconductive material to or from said area type p-n junction means; bias source means including output impedance means biasing said area type p-n junction means so as to facilitate passage of minority carriers in said semiconductive material through said area type p-n junction means; the output voltage being taken from the other electrode means of said area type p-n junction means.

9. In combination, a Hall-effect plate of a non-intrinsic semiconductive material of generally rectangular cross section; means for establishing a longitudinal current through said plate; said Hall-effect plate forming one electrode of p-n junction means formed at least at one edge thereof lateral to the direction of flow of said current; bias source means including output impedance means biasing said p-n junction means to permit substantially unobstructed passage therethrough to the other electrode thereof of minority carriers in said Hall-effect plate; and magnetic field producing means for selectively deflecting minority and majority carriers in said plate toward and away from said p-n junction means in accordance with the direction of said magnetic field.

10. In combination, a Hall-effect plate of a non-intrinsic semiconductive material and generally rectangular cross section; means for establishing a longitudinal current through said plate; said Hall-effect plate forming one electrode of area type p-n junction means formed at least at one edge thereof lateral to the direction of flow of said current; bias source means including output impedance means biasing said p-n junction means to permit substantially unobstructed passage therethrough to the other electrode thereof of minority carriers in said Hall-effect plate; and magnetic field producing means for selectively deflecting minority and majority carriers in said plate toward and away from said area type p-n junction means in accordance with the direction of said magnetic field.

11. A power meter for measuring the electrical power drawn from an electrical source by a load comprising a generally rectangular semiconductive plate forming one electrode of a pair of p-n junctions formed on opposite edges of said plate; magnetic field producing means for establishing a magnetic field through said semiconductive body; electrical circuit means adapted to couple said power source to said load so that current drawn by said load from said source energizes said magnetic field producing means to produce a magnetic field the magnitude of which is proportional to the magnitude of said current; said load being connected to said plate so that the voltage appearing across said load will produce a current through said plate passing generally normal to a line between said p-n junctions with no magnetic field applied to said plate; said magnetic field being adapted to deflect carriers in said semiconductive body toward one or the other of said p-n junctions in accordance with the instantaneous direction of said magnetic field, a capacitor coupled between the other electrodes of said p-n junctions adapted to produce a voltage proportional to the average voltage appearing thereacross; a voltmeter coupled across said capacitor; and means including output impedance means coupled to said other electrodes and to said plate adapted to bias said p-n junctions so as to permit flow of minority carriers in said plate across said p-n junction.

12. A power meter for measuring the electrical power drawn from an electrical source by a load comprising a generally rectangular semiconductive plate forming one electrode of a pair of p-n junctions formed on opposite edges of said plate; magnetic field producing means for establishing a magnetic field through said semiconductive body; electrical circuit means adapted to couple said power source to said load so that current drawn by said load from said source energizes said magnetic field producing means to produce a magnetic field the magnitude of which is proportional to the magnitude of said current; said load being connected to first and second terminals on the other opposite edges of said plate so that the voltage appearing across said load will produce a current through said plate passing generally normal to a line between said p-n junctions with no magnetic field applied to said plate; said magnetic field being adapted to deflect carriers in said semiconductive body toward one or the other of said p-n junctions in accordance with the instantaneous direction of said magnetic field, a capacitor coupled between the other electrodes of said p-n junctions adapted to produce a voltage proportional to the average voltage appearing thereacross; a voltmeter coupled across said capacitor; first and second bias source means for said p-n junctions adapted to bias said junctions to facilitate flow of minority carriers in said plate across said junctions; means coupling each of said bias sources between one of said first and second terminals and an individual one of said other electrodes, said means including output impedance means in series with said bias source and potentiometer means having a variable tap connected to said one of said first and second terminals and outer terminals connected to said electrodes.

13. In combination: a generally rectangular body of semiconductive material having minority current carriers and majority current carriers therein; first and second p-n junctions formed on first and second opposite edges of said rectangular body; means connected to third and fourth opposite edges of said rectangular body for establishing current flow therebetween; each of said p-n junctions including said rectangular body as one electrode thereof; bias means coupled between one of said third and fourth edges and the other electrodes of said p-n junctions by third and fourth output impedance means respectively; said bias means being of such a polarity as to facilitate passage through said p-n junctions of said minority carriers in said semiconductive body, magnetic field producing means for deflecting said minority carriers toward one of said p-n junctions and away from the other; said output impedance means having a common junction; and output terminals connected to said other electrodes.

14. The apparatus of claim 13 wherein the rectangular body is of non-intrinsic semiconductive material having a ratio of minority carrier density to majority carrier density not exceeding 1 to 10.

References Cited in the file of this patent

UNITED STATES PATENTS

| | | |
|---|---|---|
| 2,464,807 | Hansen | Mar. 22, 1949 |
| 2,550,492 | Millar | Apr. 24, 1951 |
| 2,551,265 | Hansen | May 1, 1951 |
| 2,553,490 | Wallace | May 15, 1951 |
| 2,562,120 | Pearson | July 24, 1951 |
| 2,695,930 | Wallace | Nov. 30, 1954 |
| 2,736,822 | Dunlap | Feb. 28, 1956 |

FOREIGN PATENTS

| | | |
|---|---|---|
| 659,653 | Great Britain | Oct. 24, 1951 |